May 24, 1932.  W. W. CLELAND  1,859,618

ROTARY INTERNAL COMBUSTION ENGINE

Filed Sept. 18, 1929  2 Sheets-Sheet 1

INVENTOR.
Ward W. Cleland
BY
ATTORNEYS.

May 24, 1932.  W. W. CLELAND  1,859,618
ROTARY INTERNAL COMBUSTION ENGINE
Filed Sept. 18, 1929   2 Sheets-Sheet 2

INVENTOR.
Ward W. Cleland
BY
ATTORNEYS.

Patented May 24, 1932

1,859,618

UNITED STATES PATENT OFFICE

WARD W. CLELAND, OF FORT WAYNE, INDIANA

ROTARY INTERNAL COMBUSTION ENGINE

Application filed September 18, 1929. Serial No. 393,350.

My invention relates to internal combustion engines of the rotary type and its object is to provide a simple, compact and efficient rotary engine having a minimum of parts. Another object is to provide an engine in which a rotor having combustion chambers therein is revolubly mounted upon a novel stator. Other objects and advantages will appear in the description following.

The invention is illustrated in the accompanying drawings in which

Figure 1:
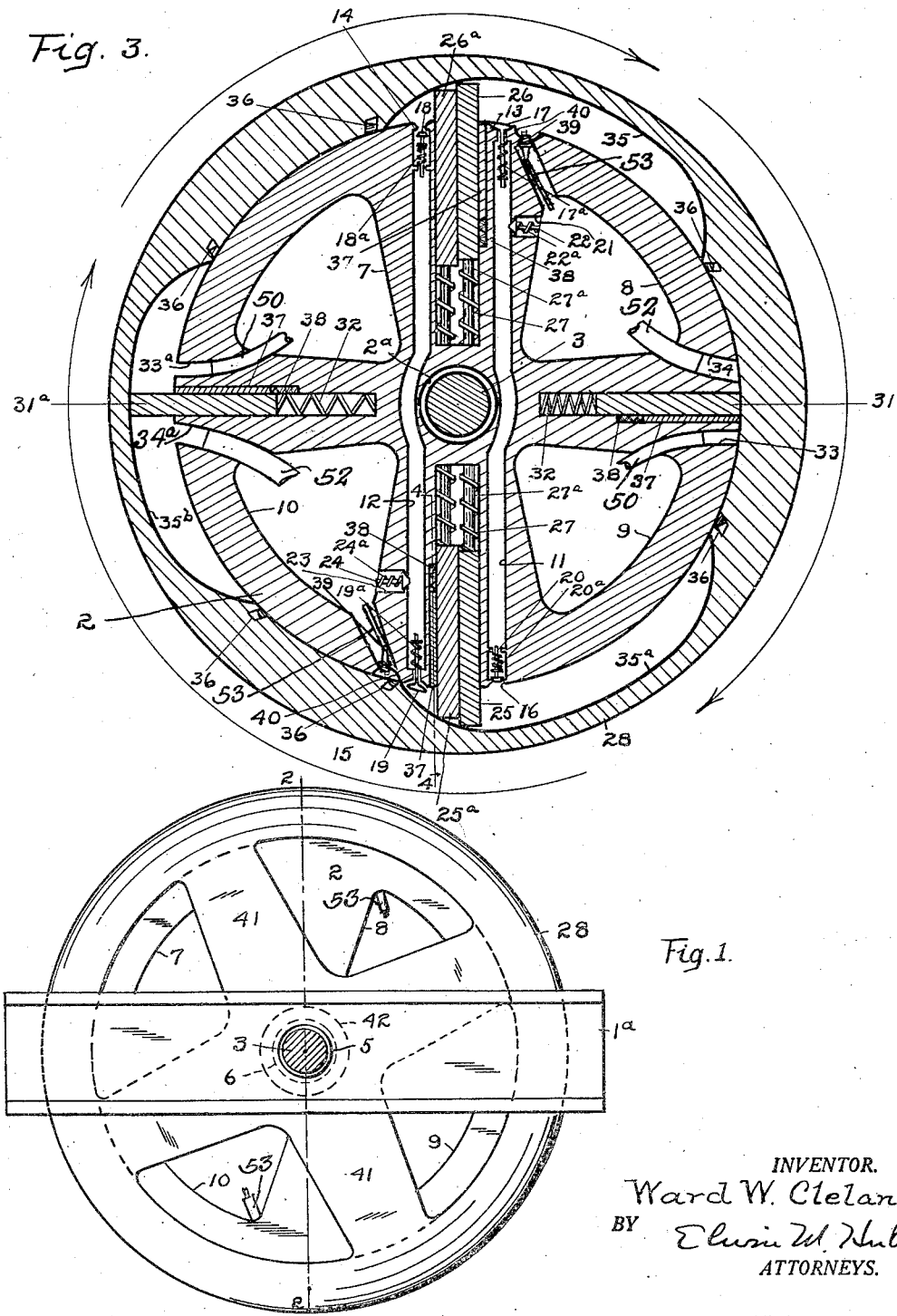
Figure 2:
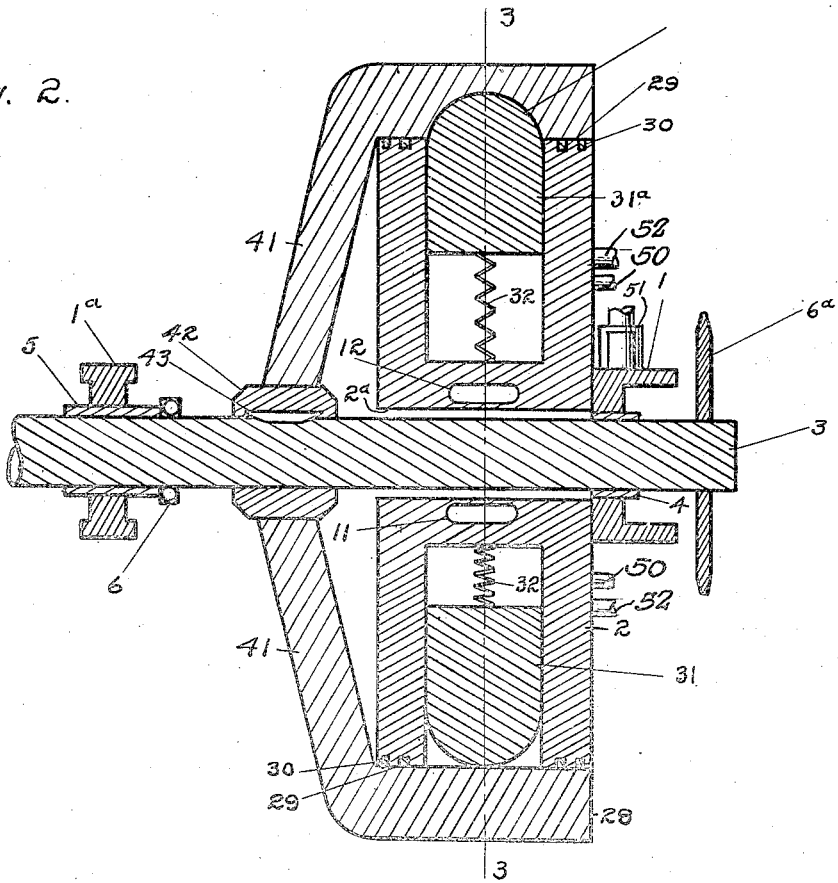
Figure 4:
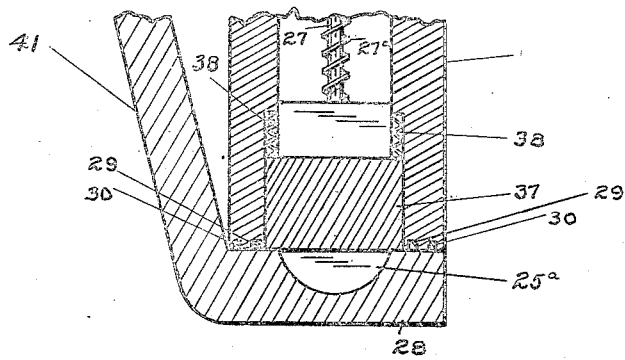

Figure 1 is an elevational view of an internal combustion engine embodying the invention; Fig. 2 a cross-section on line 2—2 of Fig. 1; Fig. 3 a cross-section on line 3—3 of Fig. 2 and Fig. 4 a cross-section on line 4—4 of Fig. 3.

Referring to the illustrative embodiment of the invention 1, 1ª represent portions of a rectangular frame, upon the member 1 of which the stator 2 is mounted. Any suitable frame will suffice. A shaft 3 is revolubly mounted in suitable bearings 4, 5, supported by the frame, 6 being a suitable thrust bearing. The shaft extends transversely through the stator preferably with ample clearance between them. The stator is cylindrical and relatively large openings 7, 8, 9 and 10 are formed in its body. Two channels 11 and 12 extend diametrically entirely through the stator upon opposite sides of the opening 2ª for the shaft 3. Seats 13, 14, 15 and 16 are suitably formed in the stator at the outer ends of the channels 11 and 12 and valves 17, 18, 19 and 20, opposed respectively by the springs 17ª, 18ª, 19ª, 20ª, are adapted to engage the seats respectively. The valves 17 and 19 open outwardly and the valves 18 and 20 open inwardly.

A port 21 is formed in the body of the stator to form a communication between the channel 11 and the opening 8 and a valve 22 opposed by spring 22ª controls the port. A similar port 23 between the channel 12 and the opening 10 is controlled by a similar valve 24 opposed by spring 24ª.

Between the two channels 11 and 12 are reciprocably mounted two pairs of radial abutments 25, 25ª and 26, 26ª each abutment of each pair having a spring 27 behind it and coiled about the guide rod 27ª of the abutment which spring tends to force the abutment outwardly through the periphery of the stator and into contact with the inner wall of the rotor 28 that is revolubly mounted on the periphery of the stator and closely fits said periphery. Grooves are formed in the periphery of the stator and receive the compression rings 29 and similar grooves in said periphery receive the lubricant rings 30.

Radial abutments 31, 31ª opposed by springs 32 are also reciprocably mounted in the stator at points 90° from the abutments 25 and 26. Upon opposite sides of the abutments 31, 31ª are formed two ports which form communications between the openings 7, 8, 9 and 10 and the periphery of the stator, the ports 33, 33ª serving as intake ports and the ports 34, 34ª serving as exhaust ports. Conduits 50 lead from the ports 33, 33ª respectively and they are suitably connected to the carburetor 51. The conduits 52 lead from the exhaust ports 34, 34ª respectively and may be connected to any suitable exhaust member.

Similar recesses 35, 35ª, 35ᵇ, are formed in the inner periphery of the rotor ring and form combustion chambers. Suitable means 36 is provided in the rotor adjacent each end of each combustion chamber to seal the rotor relatively to the stator and prevent leakage between them. The combustion chambers are concave transversely and the opposite ends of the bottom of each chamber slope longitudinally upwardly toward the inner face of the rotor. The abutments are rounded at their extremities to closely fit each said combustion chamber. Since the end of each abutment is convex it will not contact with the entire width of the inner wall of the rotor between each two combustion chambers, hence I provide a flat ended valve 37 adjacent to each pair of abutments 25, 26 and to each abutment 31 and oppose it by a spring 38. Each valve 37 will ride on the said portions of the wall of the rotor and block the escape of compression when the rounded end of the abutment under the influence of the spring behind said abutment is in the combustion chamber.

Spark plugs 39 are suitably mounted in pockets 40 formed in the periphery of the stator adjacent to the power abutments 25, 26. A gear 6ª attached to the shaft 3 may be used to drive the timing device (not shown), to which the wires 53, leading from the spark plugs 39, are connected.

Spokes 41 projecting from the rotor ring 28 also connect to a hub 42 that is splined at 43 to the shaft 3.

In operation the direction of rotation of the rotor is indicated by the arrows. The scavenging abutment 31ª is drawing vaporized fuel through port 33ª into the combustion chamber 35ᵇ. This chamber arrives at the power abutments 26, 26ª, and as it travels past said abutments the fuel is compressed by said abutments and when the pressure is great enough to open the valve 18 the fuel mixture passes into the storage chamber 12. When the power abutments 25, 25ª start to travel down the longitudinal slope at the forward end of the combustion chamber 35 and the valve 19 is exposed to said chamber the pressure of the fuel mixture in chamber 12 causes the valve 19 to open to admit the fuel from the chamber 12 into the chamber 35 where said fuel is ignited by the spark plug 39. The pressure of the combustion gases in chamber 35 closes the valve 19 and acts on the rigid power abutment to impart movement to the rotor and through it to the shaft 3.

Further rotation of the rotor causes the exhaust port 34ª to connect the combustion chamber 35 to the opening 10 and exhaust gases pass out of the chamber the scavenging abutment 31ª being effective to remove said gases. At the same time a new charge of fuel is drawn into the combustion chamber 35 through the port 33ª.

In Fig. 3 a charge of fuel mixture was drawn into the combustion chamber 35 as it passed the scavenging abutment 31ª and the port 33ª and the fuel compressed by the power abutments 26, 26ª and the compressed mixture has passed into the storage chamber 12 and is entering the combustion chamber 35ª, and ignition is about to occur whereupon the pressure of the combusting gases in the chamber 35ª will close valve 19 and cause movement of the rotor. The waste gases in the combustion chamber 35ª will discharge through the port 34ª as the combustion chamber passes the scavenging abutment 31ª and a new charge will be drawn into said chamber through port 33ª. At the same time that fuel is flowing into the combustion chamber 35 through the port 33ª, fuel is drawn into the combustion chamber 35ª through the port 33 which is compressed therein by the power abutments 25, 25ª, the compressed fuel flowing into the storage chamber 11 and from said chamber into the combustion chamber 35 where it is soon fired and a power impulse is given to the rotor. Hence the rotor receives two propelling impulses per combustion chamber at each rotation of the shaft. Any excess of pressure in the storage channels will escape through the ports 21 and 23.

Where the size of the engine will permit I may increase the number of combustion chambers, storage chambers and abutments, hence I do not limit myself to the number of such parts described and illustrated herein.

It is evident that the engine may be so constructed that it will have relatively small weight and adapted for aeroplane uses. The openings 7, 8, 9 and 10, which extend entirely through the stator, form passageways for air to cool the engine, and they also lighten the engine.

What I claim is:

1. A rotary engine comprising a stator having a plurality of air cooling openings therein, a rotor revolubly mounted on the stator and having combustion chambers therein between the stator and the rotor, abutments in the stator adapted to reciprocate in and out of the chambers successively, means to admit fuel to the chambers, a storage chamber extending diametrically through the stator and adapted to communicate at its opposite ends with the combustion chambers successively and valves to control the latter communications, one of said valves being operatively responsive to fluid pressure in any of the chambers and the other valve being operatively responsive to fluid pressure in the storage chamber.

2. A rotary engine comprising a stator having a plurality of air cooling openings therein, a rotor revolubly mounted on the stator and having a plurality of combined compression and combustion chambers therein and between the stator and the rotor, abutments reciprocably mounted in the stator and adapted to move into and out of the chambers successively, ports in the stator for admitting vaporized fuel to the chambers, storage chambers extending diametrically through the stator and adapted to communicate at their opposite ends with the compression and combustion chambers, each storage chamber having a valve at each said end, one of the valves being opened by vapor pressure in a compression and combustion chamber adjacent thereto to admit said pressure to the storage chamber and the other of said valves being opened by the vapor pressure in the storage chamber to admit said vapor to the adacent compression and combustion chamber, and means to explode the latter vapor in the compression and combustion chambers.

3. A rotary engine comprising a stator having a plurality of openings extending transversely through it for the circulation of air, a rotor revolubly mounted on the periphery of the stator and having three combined compression and combustion chambers equally spaced in its inner periphery, two storage chambers extending diametrically through the stator and adapted to communicate at opposite ends with the compression and combustion chambers successively, a plurality of abutments carried by the stator between the storage channels and adapted to reciprocate into and out of the compression and combustion chambers respectively, ports at diametrically opposed points in the periphery of the stator to admit vaporized fuel into the compression and combustion chambers successively, means to exhaust the latter chambers, valves in the opposite ends of the storage chambers respectively one valve in each storage chamber being adapted to be opened by compressed vaporized fuel in the compression and combustion chambers successively to admit said compressed vaporized fuel into the storage chambers and the remaining valves being adapted to be opened by the compressed vaporized fuel in the storage chambers to admit the said fuel into the exhausted compression and combustion chambers successively and means carried by the stator to explode the latter admitted fuel.

4. A rotary engine comprising a stator, a rotor mounted on the stator and having combustion chambers therein, abutments carried by the stator and adapted to reciprocate in and out of the combustion chambers, means to admit fuel to the chambers, a storage chamber adapted to communicate at its opposite ends with the combustion chambers successively and valves to control the latter communications, one of said valves being operatively responsive to the fluid pressure in any combustion chamber and the other valve being operatively responsive to fluid pressure in the storage chamber.

In witness whereof I have hereunto subscribed my name.

WARD W. CLELAND.